United States Patent

Tiedemann, Jr. et al.

[11] Patent Number: 5,862,471
[45] Date of Patent: Jan. 19, 1999

[54] METHOD AND APPARATUS FOR PROVIDING ROAMING INDICATION WITH CHARGE INFORMATION

[75] Inventors: Edward G. Tiedemann, Jr.; Chih-Ping Hsu, both of San Diego, Calif.

[73] Assignee: QUALCOMM Incorporated, San Diego, Calif.

[21] Appl. No.: 778,528

[22] Filed: Jan. 2, 1997

Related U.S. Application Data

[63] Continuation of Ser. No. 382,471, Mar. 21, 1995.

[51] Int. Cl.$^6$ ....................................................... H04Q 7/38
[52] U.S. Cl. ........................... 455/406; 455/432; 455/566; 379/114
[58] Field of Search .................................. 379/58, 59, 60, 379/63, 111, 112, 113, 114, 121, 130, 131, 140; 455/33.1, 33.2

[56] References Cited

U.S. PATENT DOCUMENTS

| | | | |
|---|---|---|---|
| 5,027,388 | 6/1991 | Bradshaw et al. | 379/112 |
| 5,134,651 | 7/1992 | Ortiz et al. | 379/112 |
| 5,303,297 | 4/1994 | Hillis | 379/63 |
| 5,361,297 | 11/1994 | Ortiz et al. | 379/130 |

FOREIGN PATENT DOCUMENTS

| | | | |
|---|---|---|---|
| 0526118 | 2/1993 | European Pat. Off. | H04M 17/02 |
| 0647055 | 4/1995 | European Pat. Off. | H04M 15/28 |
| 3-132294 | 6/1991 | Japan | 379/58 |
| 94/28670 | 12/1994 | WIPO . | |
| 9428670 | 12/1994 | WIPO | H04M 15/16 |

*Primary Examiner*—Dwayne Bost
*Assistant Examiner*—Nay Maung
*Attorney, Agent, or Firm*—Russell B. Miller; Gregory D. Ogrod; Sean English

[57] ABSTRACT

A method and apparatus for providing a mobile station user with information about anticipated roaming charges. The visitor communication system transmits a graded roaming signal to the mobile station user indicative of the anticipated roaming costs. The graded roaming signal is determined by contractual agreements between the visitor communication system provider and user's service provider. This information is stored in a data base at the user's home communication system and is provided to the visitor communication system upon request for authorization to provide service. The graded roaming signal is broadcast to the mobile station and displayed to allow the mobile station user to estimate the cost of the service being provided.

26 Claims, 2 Drawing Sheets

METHOD AND APPARATUS FOR PROVIDING ROAMING INDICATION WITH CHARGE INFORMATION

This is a Continuation of application Ser. No. 08/382,471, filed Mar. 21, 1995.

BACKGROUND OF THE INVENTION

I. Field of the Invention

The present invention relates to mobile telephony. More particularly, the present invention relates to a novel and improved method and apparatus for providing roaming indication indicative of anticipated roaming charges.

II. Description of the Related Art

As mobile communication systems become more prevalent in society the demands for greater and more sophisticated service have grown. To meet the capacity needs of mobile communication systems, techniques of multiple access to a limited communication resource have been developed. The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems.

The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

Users of mobile telephones have desired to be able to use their mobile phone regardless of their location This desire caused mobile communications providers to negotiate contracts among themselves to provide services known as "roaming" to their customers. A "roamer" is a mobile station which requires service in a system which is operated by a mobile communications service provider other than the one to which the user subscribes.

Currently when a mobile station is roaming, a signal indicative of the roaming condition is provided to the user and displayed as a result of a comparison of the system identification (SID) of the subscribed system which is semi-permanently stored in the mobile station with the SID of the system providing service broadcast from the base station. This alerts the user of the mobile station that the service being provided is accruing roaming costs. Because the contracts between different companies differ, a roamer is typically assuming an unknown risk as to the cost of the service being provided, since he knows neither of the contracts between the service provider and system to which he subscribes nor does he know the identity of the provider of the roaming service.

SUMMARY OF THE INVENTION

The present invention is a novel and improved method and apparatus for providing a user of a mobile station with a notice indicative of anticipated expenses of the roaming service being provided. In the present invention, when a mobile station registers with a communication system operated by a service provider other than the provider to which he subscribes, hereafter referred to as the visitor communication system, the visitor communication system will transmit a signal indicative of the costs of the anticipated roaming charges.

When a mobile station registers with the visitor communication system, the visitor communication system sends an authorization request message to the mobile station user's home communication system, the mobile station user's home communication system is the system to which the user subscribes service. The home communication system provides a graded roaming signal indicative of the anticipated roaming charges. The anticipated roaming charges are typically based on the contractual agreements between the home communication system service provider and the visitor communication system service provider. A signal indicative of the anticipated roaming charges is transmitted to the mobile station and displayed for the user.

In a preferred embodiment the graded roaming signal is provided over a control channel (paging channel) prior to start of communications on a voice or data channel (traffic channel) and could be part of the indication that the registration is accepted. In an alternative embodiment the call is set up and the graded roaming signal is provided over the traffic channel. This allows the mobile station user to make a timely decision as to whether to conduct the service based upon the anticipated cost. Ideally all service providers would be required to provide the graded roaming signal to a roaming user for the benefit of mobile station users.

When the graded roaming signal is transmitted to the mobile station user, the information is provided to the mobile station user. In the exemplary embodiment, the signal indicates the anticipated roaming costs charged by the visitor communication system provider relative to those costs charged by to other providers. In the exemplary embodiment, a relative signal such as a number of dollars signs is displayed on a visual screen of the mobile station to alert the user of the anticipated roaming costs. It is unlikely that the system can provide absolute billing information, because factors such as group discounts and bulk discounts make it difficult to provide of real time billing information. However, if real time billing is possible, then the base station can provide an indication of the actual cost of the service being provided, which the mobile station may then display the absolute cost of the service being received.

In an alternative embodiment, which is useful in the case where the visitor communication system does not have a timely connection to the home communication system, the visitor communication system transmits to the mobile station an identification signal which the mobile station then displays the name of the visitor communication system service provider for the user. By knowing the name of the visitor communication system service provider, the user can make a more educated estimate of the roaming costs.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
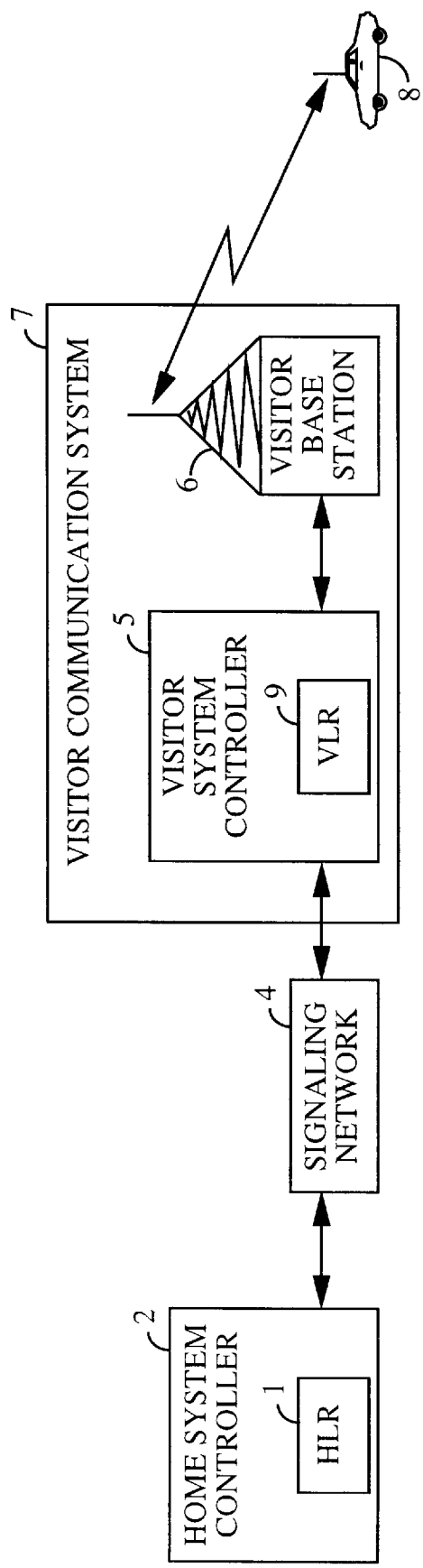
FIG. 1 is a block diagram illustrating an exemplary system implementation of the present invention.

Referring to FIG. 1, when mobile station 8 enters a geographical situation that prevents it from obtaining service from the home communication system mobile station 8 registers with a visitor communication system 7. In the exemplary embodiment, mobile station 8 is spread spectrum mobile station as is detailed in the aforementioned U.S. Pat. Nos. 4,901,307 and 5,103,459.

Mobile station 8 provides identification information to visitor base station 6. Visitor base station 6 then provides the information to visitor system controller 5. Visitor system controller 5 contains the visitor location register (VLR) 9. The visitor location register (VLR) maintains records, for billing purposes, of all service being provided to roaming stations such as mobile station 8. Visitor communication system 7 seeks authorization to provide service from the home communication system of mobile station 8.

Visitor communication system 7 sends a request to provide service through signaling network 4 to home system controller 2. Home system controller 2 contains a data base referred to as home location register (HLR) 1. HLR 1 contains user profile information comprising an authorization to permit roaming, user features, and information about anticipated roaming costs based upon contractual agreements between the home communication system provider and the visitor communication system provider. In the exemplary embodiment, the graded roaming signal is a relative indication of how the roaming charges of the visitor communication system provider compare to other companies' roaming charges.

Home system controller 2 provides the information including an authorization to permit roaming, user features, and information about anticipated roaming costs through signaling network 4 to visitor communication system 7. In the exemplary embodiment, when visitor communication system 7 receives the registration accepted order, the graded roaming signal is transmitted to mobile station 8 prior to or during call set up.

An indication of the graded roaming signal is then displayed by mobile station 8, which allows the user to estimate the likely roaming charges. In the exemplary embodiment, mobile station 8 displays a plurality of dollar signs on a display screen the number of which are indicative of the estimated relative roaming costs. The larger the number of dollar signs displayed the larger the estimated roaming costs, the fewer the number of dollar signs displayed the lower the estimated roaming costs.

In an alternative embodiment, the user of mobile station 8 is provided a standard text signal by visitor communication system 7. The standard text signal identifies the carrier providing the roaming service to the mobile station user. An exemplary embodiment of the standard text signal is an ASCII text signal. By knowing the identity of the carrier providing service, the user of mobile station 8 can make a more educated estimate of the anticipated roaming charges. In the exemplary embodiment, mobile station 8 displays the name of the visitor communication system service provider in plain text on a display screen of mobile station 8.

Figure 2:
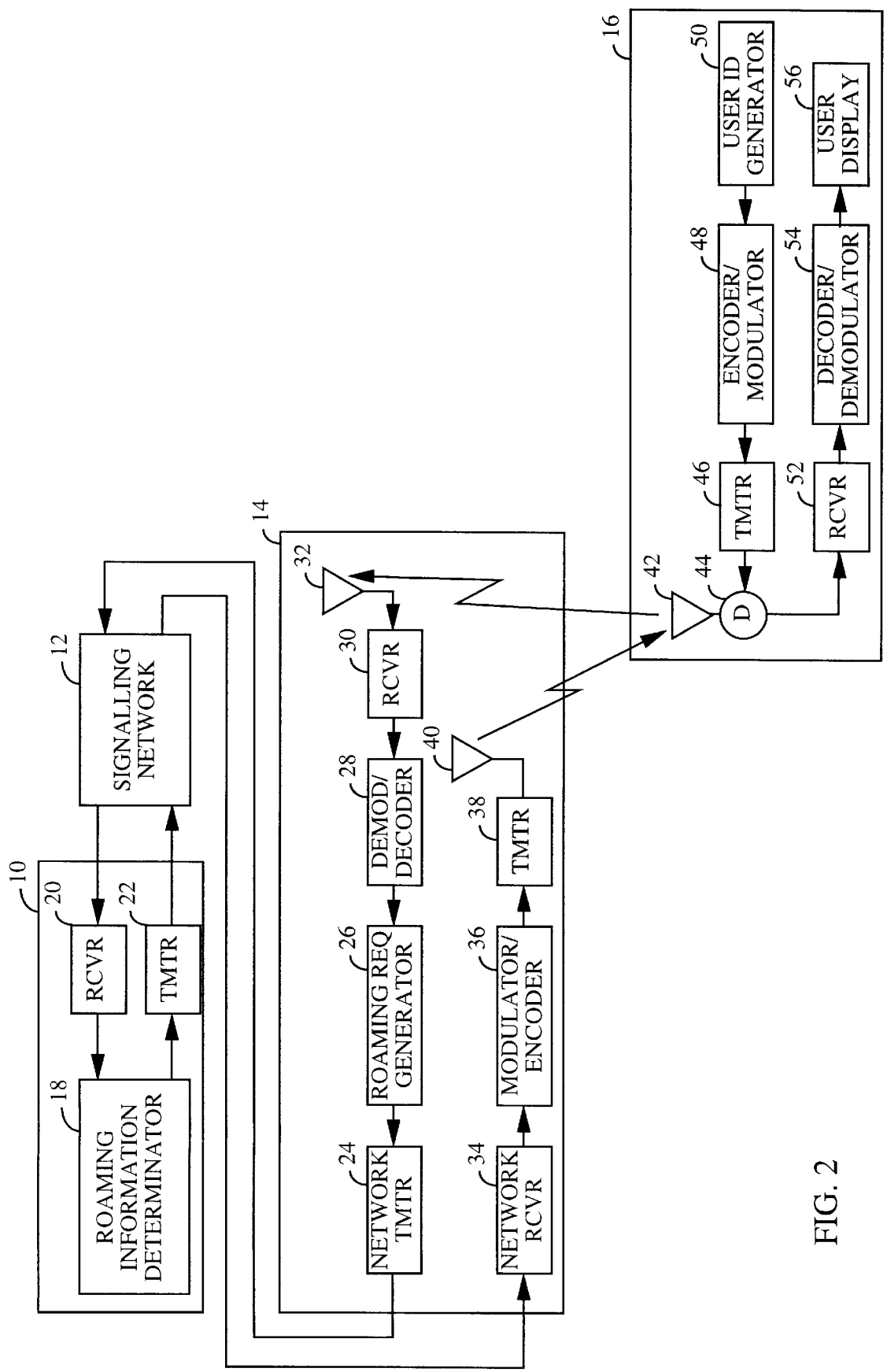
FIG. 2 is a block diagram illustrating an exemplary embodiment of the apparatus of the present invention.

FIG. 2 illustrates a block diagram of the communications system of the present invention. When mobile station 16 attempts to obtains service in an area served by the visitor communication system 14, then mobile station 16 sends a roaming request signal to visitor communication system 14. It should be noted that the functions of the visitor base station and visitor system controller are illustrated in one integrated element as visitor communication system 14. This is for simplicity because the functions of the base station and system controller can be divided in a variety of ways, as is well known in the art.

User identification generator 50 generates a signal identifying mobile station 16 and its home communication system. The signal may also include information as to the type of service requested and an identification of the capabilities of mobile station 16.

The request message is provided by generator 50 to encoder/modulator 48 which encodes and modulates the signal for transmission. In the exemplary embodiment, the modulation format used is a CDMA spread spectrum modulation format as described in the aforementioned U.S. Pat. Nos. 4,901,307 and 5,103,459, although other digital modulation techniques such as TDMA could be used. The modulated message signal is provided to transmitter (TMTR) 46 which upconverts and amplifies the signal. The amplified and upconverted signal is provided through duplexer 44 for broadcast through antenna 42. In an alternative embodiment such as an analog system the encoder function is not required.

The broadcast signal from mobile station 16 is received at antenna 32 of visitor communication system 14. The received signal is provided to receiver 30 which downconverts and amplifies the signal. The received signal is then provided to decoder/demodulator 28. In the exemplary embodiment, the demodulation format used is a CDMA spread spectrum demodulation format as described in the aforementioned U.S. Pat. Nos. 4,901,307 and 5,103,459, although other digital demodulation formats could be used. The demodulated signal is provided to roaming request generator 26. Generator 26 generates a packet that contains the identification of mobile station 16, an identification of the system provider of visitor communication system 14 and is addressed to home system controller 10. The packet may also contain information regarding the service requested.

The roaming request packet is provided by generator 26 to network transmitter 24 which formats, modulates and amplifies the signal for transmission to home system controller 10. The packet is provided through signaling network 12 to home communication system controller 10. Signaling network 12 can be either a public switching transmission network (PSTN) or it can be a network specifically designed to carry messages between different service providers.

The signal is received at home system controller receiver (RCVR) 20. Home system controller receiver 20 downconverts and amplifies the received signal and provides the information to roaming information determination element 18. Information determination element 18 can be implemented by a microprocessor used in conjunction with a database storage as is well known in the art. Determination element 18 validates the identity of the user and determines if the user is permitted to roam. In addition, determination element 18 determines from the identity of the service provider of visitor communication system 14 what the anticipated roaming cost to the user of mobile station 16 is likely to be. The anticipated roaming cost is based on contracts between the two service providers. The anticipated roaming cost may also be affected by the type of service requested.

Roaming information determination generates a signal indicative of the anticipated roaming cost and provides this signal to home system controller transmitter (TMTR) 22. Transmitter 22 formats, modulates, upconverts and amplifies the signal for transmission through signaling network 12 to visitor communication system 14.

The anticipated roaming cost signal is received by visitor communication system network receiver 34. Network receiver 34 demodulates, downconverts and amplifies the received signal. The received signal is then provided to modulator/encoder 36. Modulator/encoder 36 encodes and modulates the signal for transmission to mobile station 16. In the exemplary embodiment, the modulation format used is a CDMA spread spectrum modulation format as described in the aforementioned U.S. Pat. Nos. 4,901,307 and 5,103,459. The modulated signal is provided to transmitter (TMTR) 38 which upconverts and amplifies the signal, which is then broadcast through antenna 40. In the exemplary embodiment, the graded roaming signal is provided on the paging channel. In an alternative embodiment the graded roaming signal is provided as a preliminary transmission on the traffic channel.

The signal broadcast by visitor communication system 14 is received at antenna 42 and provided through duplexer 44 to receiver 52. Receiver 52 downconverts and amplifies the received signal and provides the received signal to decoder/demodulator 54. Decoder/demodulator 54 demodulates and decodes the received signal and provides the anticipated roaming cost information signal to user display element 56. User display element 56 may be a visual display such as light emitting diode (LED) display or a liquid crystal display LCD, or user display 56 may be an auditory device for providing the anticipated roaming cost information to the mobile station user.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A mobile station capable of displaying an indication of estimated roaming charges, comprising:
   receiver means for receiving a graded roaming signal; and
   display means for displaying a representation of said graded roaming signal.

2. The apparatus of claim 1 wherein said graded roaming signal is indicative of relative roaming costs.

3. The apparatus of claim 1 wherein said graded roaming signal is transmitted over a paging channel.

4. The apparatus of claim 1 wherein said graded roaming signal is transmitted is a spread spectrum communication signal.

5. The apparatus of claim 1 wherein said representation comprises a plurality of icons indicative of the relative roaming costs.

6. The apparatus of claim 5 wherein said icons are dollar signs.

7. A mobile station capable of displaying an indication of estimated roaming charges, comprising:
   a receiver having an input for receiving a graded roaming signal and having an output; and
   a display having an input coupled to said receiver output for displaying a representation of said graded roaming signal.

8. The system of claim 7 wherein said graded roaming signal is indicative of relative roaming costs.

9. The system of claim 7 wherein said graded roaming signal is transmitted over a paging channel.

10. The system of claim 7 wherein said graded roaming signal is transmitted is a spread spectrum communication signal.

11. The system of claim 7 wherein said representation comprises a plurality of icons indicative of the relative roaming costs.

12. The system of claim 11 wherein said icons are dollar signs.

13. In mobile station a method for providing roaming charge information, comprising the steps of:
    receiving a graded roaming signal; and
    displaying a representation of said graded roaming signal.

14. The method of claim 13 wherein said graded roaming signal is indicative of relative roaming costs.

15. The method of claim 13 wherein said graded roaming signal is transmitted over a paging channel.

16. The method of claim 13 wherein said graded roaming signal is transmitted is a spread spectrum communication signal.

17. The method of claim 13 wherein said representation comprises a plurality of icons indicative of the relative roaming costs.

18. The method of claim 17 wherein said icons are dollar signs.

19. A visitor communication system, comprising:
    authentication means for receiving a visiting mobile station service request signal and for generating a roaming authorization message in accordance with said mobile station service request signal, and for sending said roaming authorization message to a visiting mobile station home location register; and
    graded roaming charge transmitter means for receiving from said visiting mobile station home location register a graded roaming message and for transmitting a graded roaming signal.

20. The apparatus of claim 19 wherein said graded roaming charge transmitter means transmits said graded roaming signal in accordance with a spread spectrum modulation format.

21. A visitor communication system, comprising:
    a visitor location identifier having an input for receiving a visiting mobile station service request signal and having an output for providing a roaming authorization message; and
    a transmitter means having an output for providing a graded roaming signal.

22. The apparatus of claim 21 wherein said transmitter transmits said graded roaming signal in accordance with a spread spectrum modulation format.

23. In a visitor communication system, a method for providing a visiting mobile station user with a graded roaming signal, comprising the steps of:
    receiving a visiting mobile station service request signal;
    generating a roaming authorization message in accordance with said mobile station service request signal;
    sending said roaming authorization message to a visiting mobile station home location register; and
    receiving from said visiting mobile station home location register a graded roaming message; and
    transmitting a graded roaming signal.

24. The apparatus of claim 23 wherein said step of transmitting said graded roaming charge transmits said graded roaming signal in accordance with a spread spectrum modulation format.

25. A home communication system, comprising:

subscriber authorization means for receiving a roaming authorization message and for generating an authorization response message and for generating a graded roaming message; and transmitter for sending said authorization response message and said graded roaming message.

26. The apparatus of claim 25 wherein said subscriber authorization means generates said graded roaming message in accordance with a contractual relation signal.

\* \* \* \* \*